(12) United States Patent
Firey

(10) Patent No.: US 7,281,500 B1
(45) Date of Patent: Oct. 16, 2007

(54) SUPPLEMENTARY SLURRY FUEL ATOMIZER AND SUPPLY SYSTEM

(76) Inventor: Joseph Carl Firey, P.O. Box 15514, Seattle, WA (US) 98115-0514

( * ) Notice: Subject to any disclaimer, the term of this patent is extended or adjusted under 35 U.S.C. 154(b) by 0 days.

(21) Appl. No.: 11/633,107

(22) Filed: Dec. 4, 2006

Related U.S. Application Data

(60) Provisional application No. 60/838,950, filed on Aug. 21, 2006.

(51) Int. Cl.
*F02D 19/04* (2006.01)
(52) U.S. Cl. ..................... 123/23
(58) Field of Classification Search .......... 123/1 A, 123/3, 23, 25 E
See application file for complete search history.

(56) References Cited

U.S. PATENT DOCUMENTS 4,782,794 A * 11/1988 Hsu et al. .............. 123/23
5,931,123 A *  8/1999 Firey ..................... 123/23

* cited by examiner

*Primary Examiner*—Noah P. Kamen

(57) ABSTRACT

A supplementary slurry fuel atomizer of this invention, when used on a piston internal combustion engine, equipped with a common rail fuel injection system, improves slurry atomization, following injection, by expansion of gases, previously dissolved in the water phase of the slurry. This gas expansion separates the several fuel particles in each slurry droplet formed first during fuel injection. The thusly separated fuel particles subsequently burn more rapidly and completely, due to this fuel particle separation improving air access to the fuel. Apparatus is described for dissolving atomizing gas into the water phase of the slurry, in a contactor chamber at a pressure greater than the pressure prevailing in the engine cylinder volume, at the time of slurry injection.

17 Claims, 7 Drawing Sheets

SUPPLEMENTARY SLURRY FUEL ATOMIZER AND SUPPLY SYSTEM

CROSS REFERENCES TO RELATED APPLICATIONS

The invention described herein is directly related to my earlier filed Provisional U.S. Application Ser. No. 60/838,950, entitled, Supplementary Slurry Fuel Atomizer, filed 21 Aug. 2006, Confirmation No. 8284. The invention described herein is also related to my recently transmitted Provisional US Application, entitled, Common Rail Supplementary Atomizer for Piston Engines, for which a serial number and filing date have not yet been received.

SUMMARY OF THE INVENTION

A supplementary slurry fuel atomizer and supply system, of this invention, comprises a contactor chamber, in which fuel in water slurry is contacted with atomizing gas, at a pressure well above the pressure prevailing in the cylinder gas volume of an internal combustion engine. All, or portions, of the atomizing gas dissolve into the water phase of the slurry fuel. The gas remains in solution, while the slurry remains under high pressure, through the common rail fuel injection system of the internal combustion engine. Slurry injection into the engine cylinder gas volume breaks up the slurry fuel into many small droplets. But each droplet contains many separate small fuel particles, and these tend to agglomerate into larger fuel particles when the water portions evaporate, prior to combustion. However, when the water phase of the slurry contains atomizing gas, dissolved at the high pressure in the contactor chamber, the injected fuel droplets will be broken apart when these dissolved gases expand out of solution, at the lower pressures in the cylinder gas volume, and the small separate fuel particles will thus be separated from each other, instead of agglomerating into fewer larger fuel particles. As a result a greater area of fuel particle surface is available for air access, and these small fuel particles are dispersed into a larger air volume. In this way the combustion of a slurry fuel will be more rapid and complete, when using a supplementary slurry fuel atomizer of this invention, and this is a principal beneficial object of this invention.

Earlier engine experiments, with coal particle in water slurry fuels, indicates that, as coal particle size was reduced, in an effort to increase the rate of combustion, these smaller particles increased the effective viscosity of the slurry, and larger slurry droplets resulted during fuel injection into the engine. Subsequent coal particle agglomeration within each droplet, created larger fuel particles with slower, and less complete, combustion. As a result, better engine performance was obtained at intermediate coal particle size, and the anticipated better results, for very small coal particles, were not realized. It is a principal beneficial object of this invention to make available the improvements of engine combustion, potentially available from the use of smaller coal particles, or smaller residual petroleum fuel particles, in fuel in water slurry fuels, Many internal combustion engine applications, currently obliged to operate on expensive distillate petroleum fuels, could operate instead on low cost residual petroleum fuels by use of the apparatus of this invention. In this way a larger portion of the crude petroleum oil could be used for our critical transportation needs.

BACKGROUND OF THE INVENTION

The use of high viscosity low cost fuels, such as residual petroleum fuels, in internal combustion engines is presently limited to very large bore, slow speed, marine diesel engines. In these large bore engines, the high fuel injection pressures, needed for adequate atomization of residual petroleum fuels, can be utilized without excessive fuel penetration and cylinder wall impact, since the large cylinder diameter provides an adequately long fuel spray penetration path. But in medium speed, medium bore, diesel engines, and particularly in high speed, small bore, diesel engines, these high viscosity residual petroleum fuels are poorly burned. Either poor atomization results, at injection pressures low enough to avoid fuel impact on the cylinder wall, or fuel impact on the cylinder wall occurs, at the high injection pressures needed for adequate atomization of these high viscosity fuels.

Preatomizing the fuel, outside of the engine cylinder volume, and suspending the very small fuel particles in a continuous water phase, to create a fuel-in-water slurry offers a potential method for utilizing high viscosity residual petroleum fuels, in both medium bore, medium speed, diesel engines, and small bore, high speed, diesel engines, which are widely used in our transportation systems. An example method and apparatus for preparing such residual petroleum fuel in water slurries is described in U.S. Pat. No. 6,444,000, 2002, Firey. Use of such preatomized, fuel in water slurries would appear to relieve the engine fuel injection system of the obligation to carry out the full extent of atomization needed for rapid and complete fuel burning, and hence the lower fuel injection pressures, with the reduced penetration, needed in small or medium bore engines can be used, and yet adequate atomization, with rapid and complete fuel combustion, will result.

Engine experiments, with coal particle in water slurry fuels, in medium speed, medium bore, railroad diesel engines, revealed a potential limitation in the combustion benefits to be obtained by use of increasingly smaller fuel particle size, in fuel in water slurry fuels. As fuel particle size was reduced, the effective viscosity of the slurry increased, and larger slurry droplet size resulted when the slurry was injected into the engine cylinder volume. Thus a greater number and weight of fuel particles resided within each injected slurry droplet, as fuel particle size was reduced.

Indications are that within each slurry droplet, the several separate small fuel particles tended to reagglomerate into one, or a few, larger fuel particles, when the water phase evaporated prior to ignition and combustion. The result was that, the benefits sought by preatomizing the fuel into smaller particles, were not realized, and best engine results were obtained at intermediate fuel particle size.

The capability of operating a major portion of our transportation system on low cost residual petroleum fuels, instead of the present high cost distillate petroleum fuels, would be a substantial benefit. Diesel engine operators would realize a reduced fuel cost. The national effort toward energy independence would be promoted, since the stationary energy applications, currently using residual fuels, could more readily and economically shift to coal use than is possible for the critical transportation sector.

BRIEF DESCRIPTION OF THE DRAWINGS

An example form of this invention is shown schematically in FIG. 1, and comprises, an internal combustion engine, 1, equipped with a common rail fuel injection system, 9, supplied with a slurry fuel, whose continuous water phase has been almost saturated with atomizing gas, while passing through the contactor chamber, 15.

Another example form of this invention is shown schematically in FIG. 2, wherein engine exhaust gas is used as the atomizing gas being compressed into the contactor chamber, 15.

Figure 3:
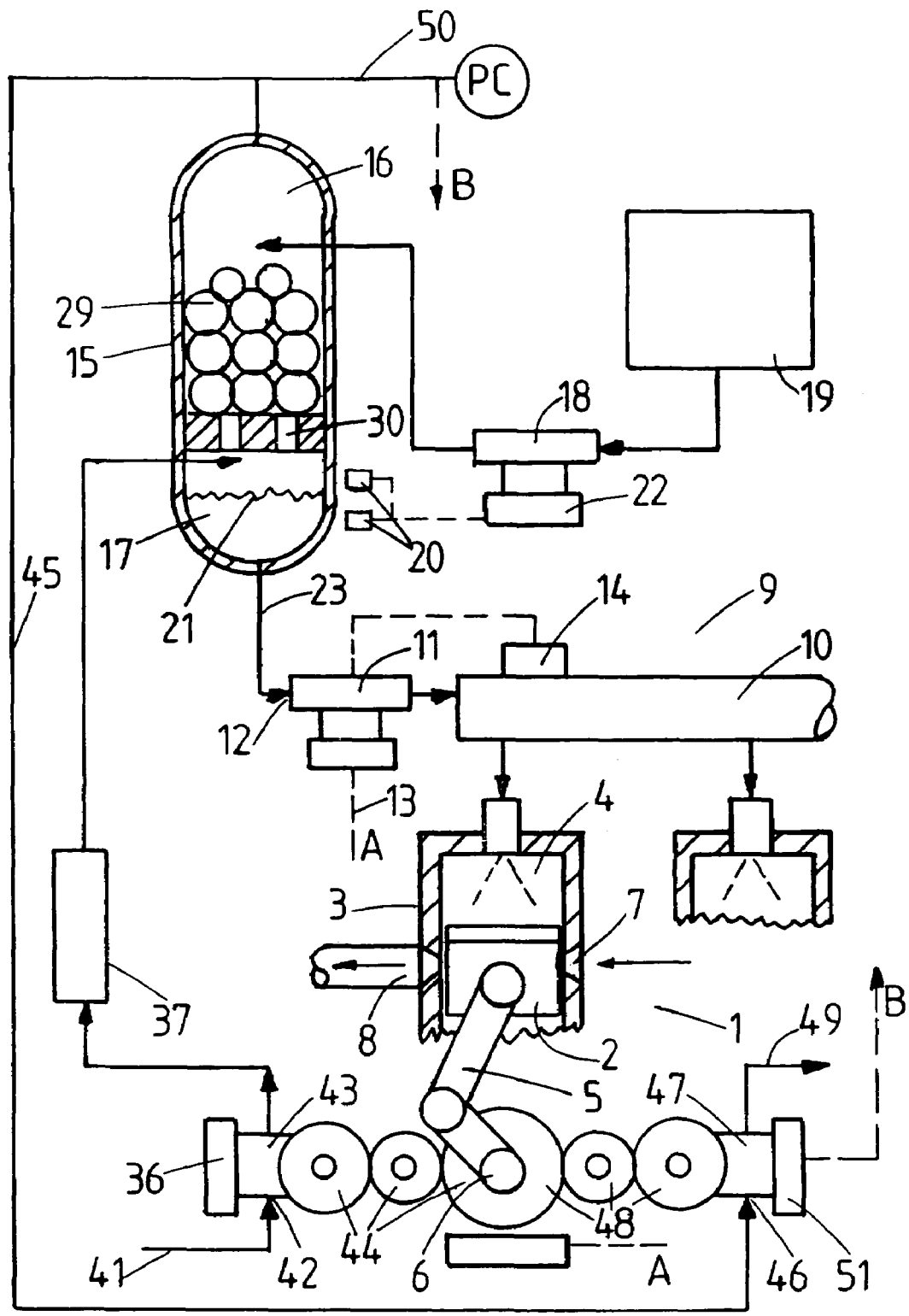

The example form of this invention shown schematically in FIG. 3 utilizes air as atomizing gas, and recovers work from the undissolved gases by use of a work recovery expander engine, 47.

Figure 4:
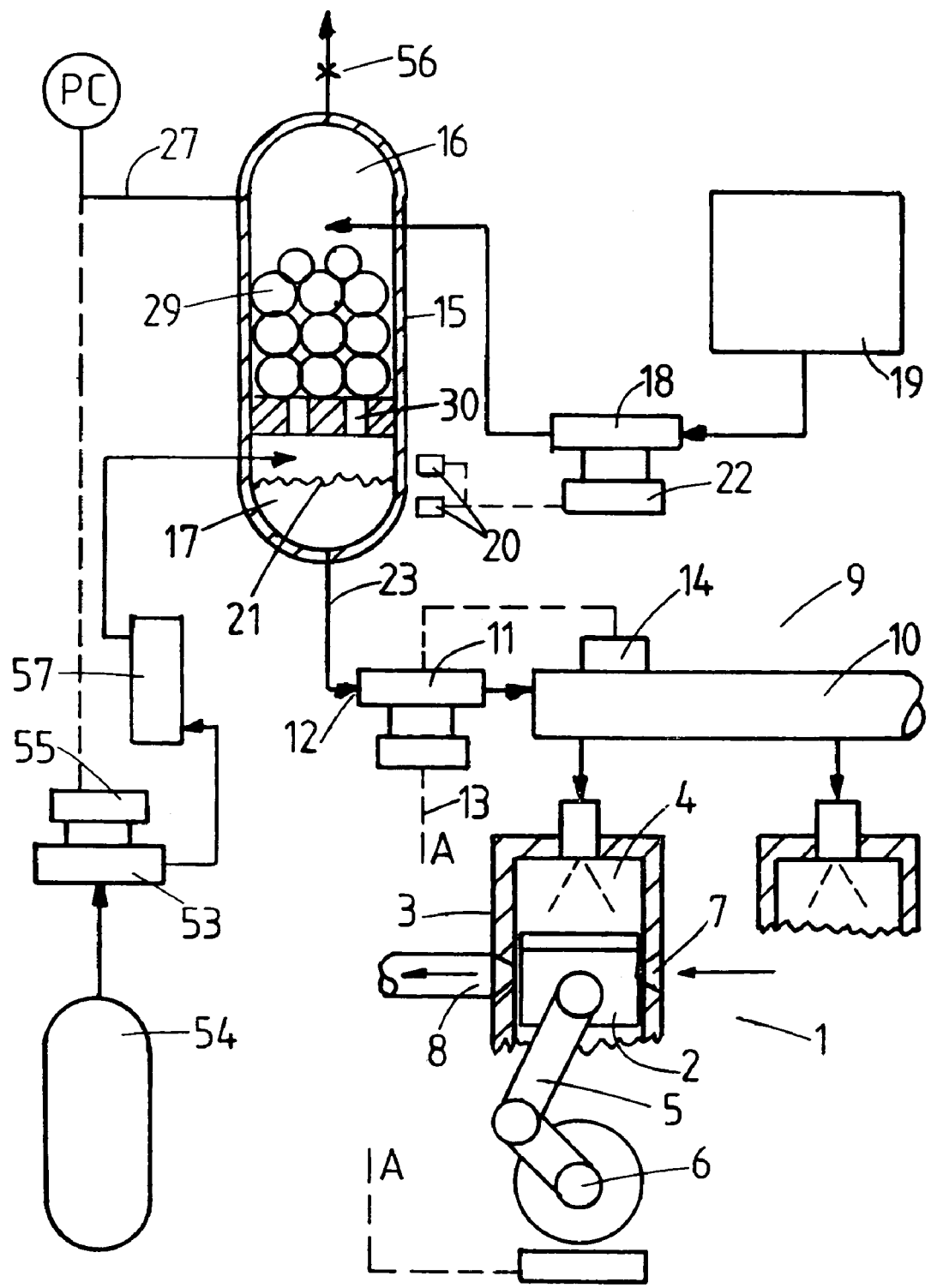

A further example form of this invention is shown schematically in FIG. 4 wherein precompressed atomizing gas is supplied from a tank, 54, which can be recharged with atomizing gas at a central gas compressor plant.

Figure 5:
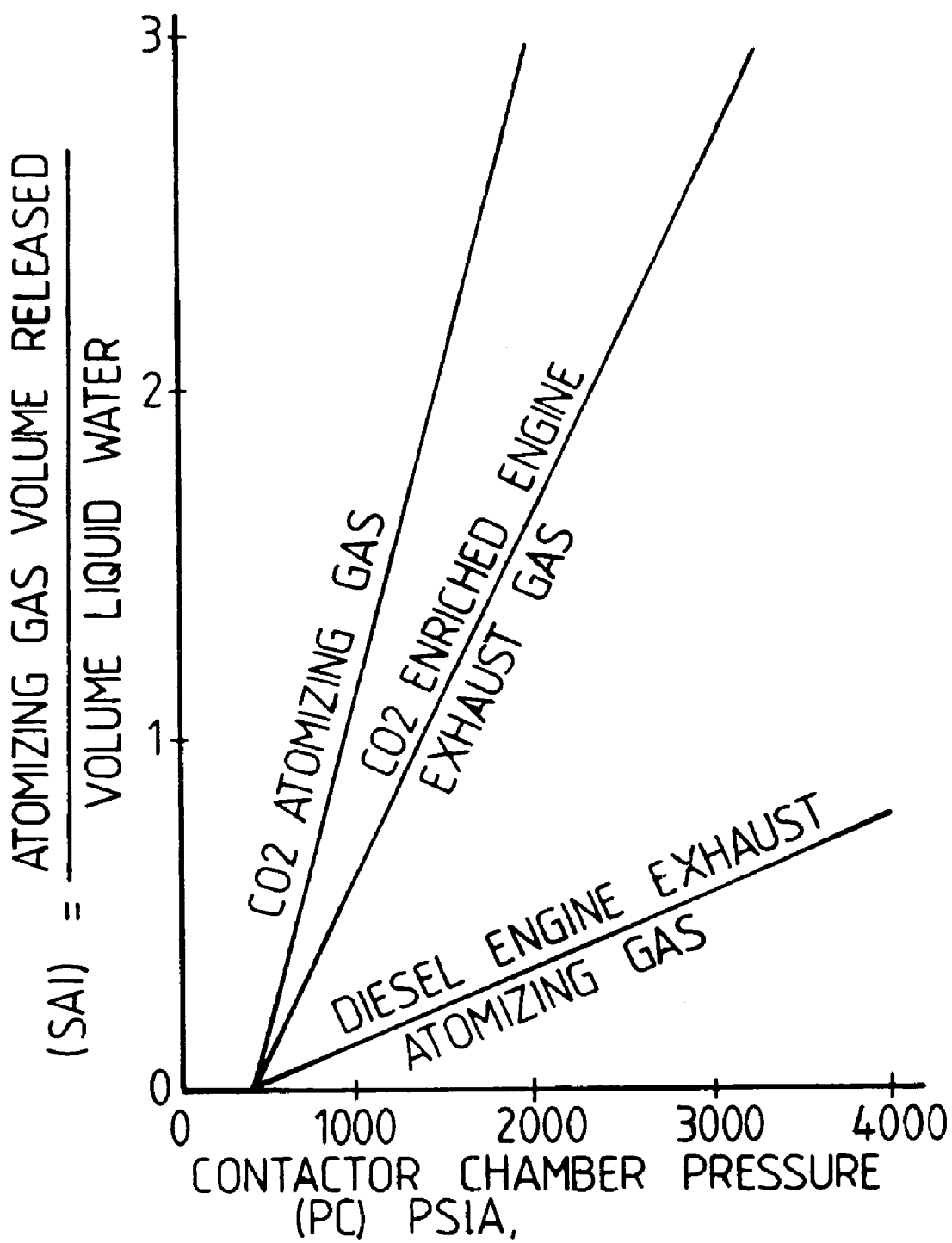

The supplementary atomizing capacity of several illustrative atomizing gases is shown graphically in FIG. 5 as a function of contactor chamber pressure.

Figure 6:
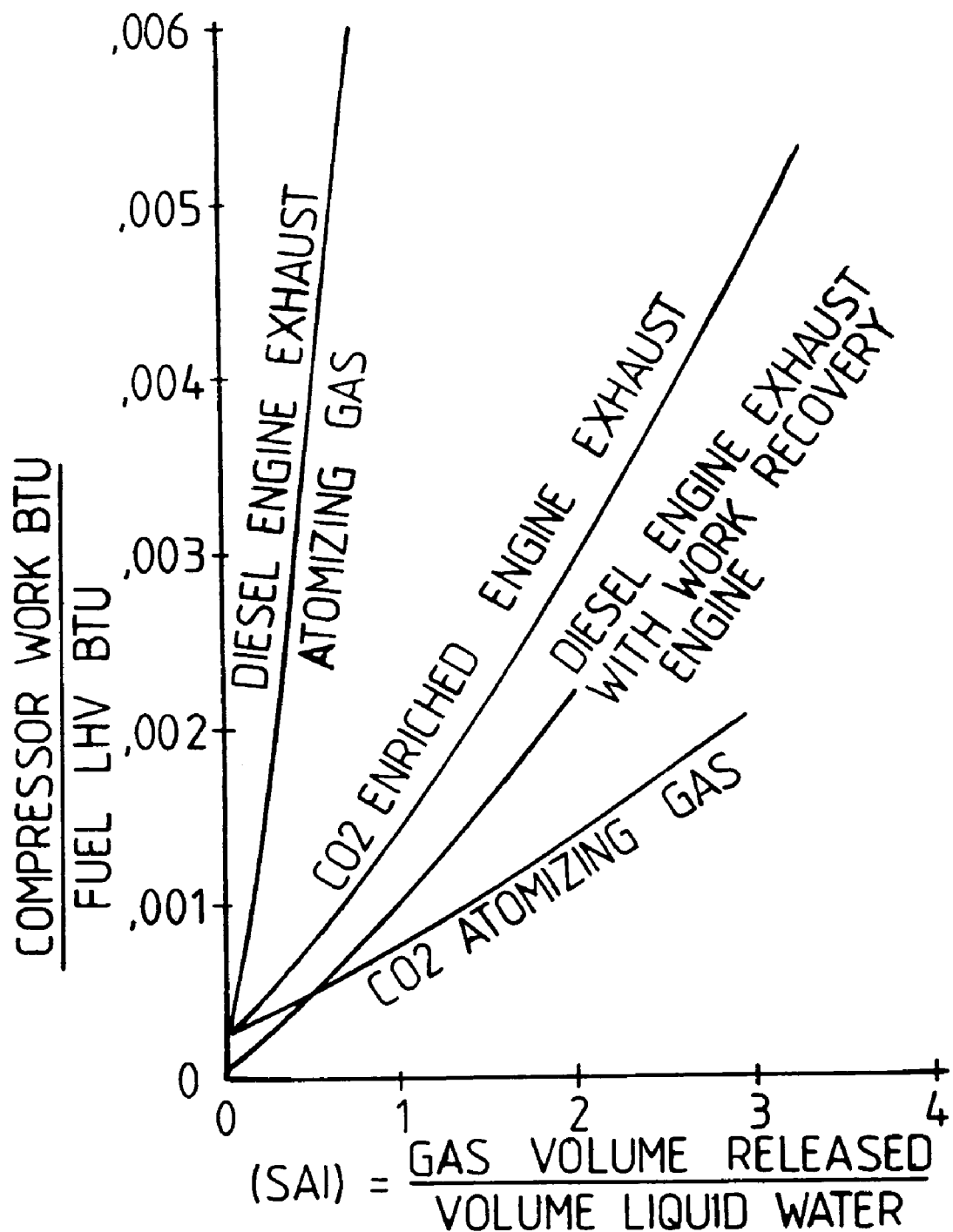

The engine work output lost to the compressing of the atomizing gas is shown graphically in FIG. 6, for several atomizing gases, as a function of supplementary atomizing capacity.

Figure 7:
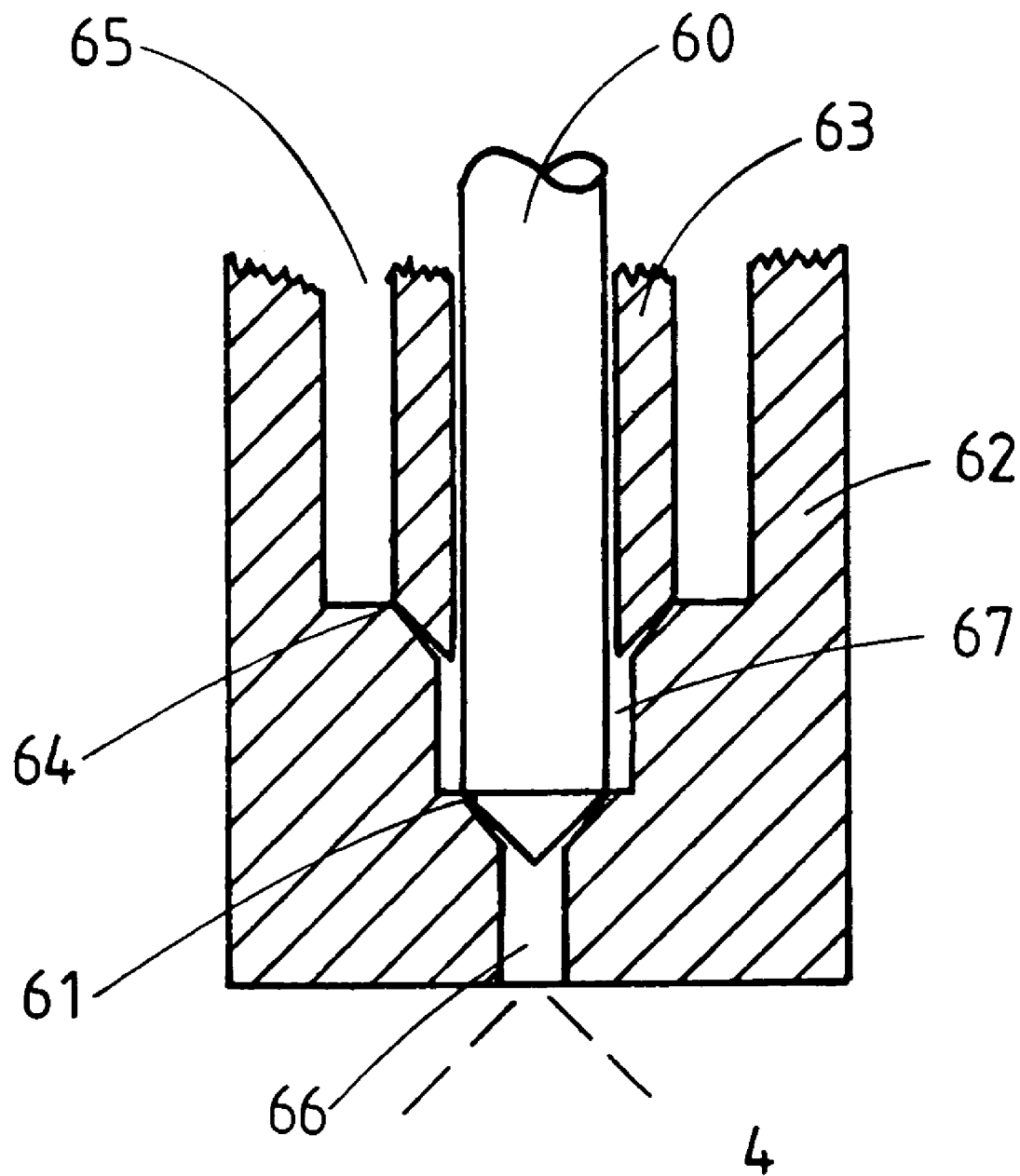

And example form of fuel injector nozzle with double valves in the fuel flow passage is shown schematically in FIG. 7.

None of the apparatus drawings are to scale.

DESCRIPTION OF THE PREFERRED EMBODIMENTS

The apparatus of this invention operates to dissolve atomizing gas, at high pressure, into the liquid water portion of a fuel in water slurry, where liquid water is the continuous phase. When this gas saturated slurry is subsequently injected, into the lower pressures prevailing in the engine cylinder gas volume, these dissolved gases expand out of the water phase within each injected slurry droplet. This gas expansion between fuel particles separates the particles and prevents particle agglomeration during subsequent water evaporation, prior to fuel ignition and combustion. In this way the full benefits of fuel preatomization into very small fuel particles, suspended in a continuous water phase, can be achieved by use of the apparatus of this invention.

Various kinds of non gaseous fuels can be used for the fuel particle portion of these fuel particle in liquid water slurries, wherein the liquid water is the continuous phase, such as, residual petroleum fuels, coal, petroleum coke, tars as from tar sands, charcoal as from wood or farm agricultural materials.

A. The FIG. 1 Form of the Invention

The apparatus of this invention comprises a combination of a piston internal combustion engine with a supplementary slurry fuel atomizer and supply system. One particular example form of this combination is illustrated schematically in FIG. 1.

1. The piston internal combustion engine portion of this combination comprises the following elements:
    (a) A piston internal combustion engine, 1, comprises a piston, 2, operative within a cylinder, 3, and these enclosing a cylinder gas volume, 4. The piston connects, via a connecting rod, 5, to the engine crankshaft, 6. Air for combustion enters the cylinder gas volume via an intake port, 7, and burned exhaust gas leaves the cylinder gas volume via an exhaust port and pipe, 8.
    (b) For the purposes of this invention, the internal combustion engine, 1, also comprises a common rail fuel injection system, 9, comprising a common rail chamber, 10, into which a common rail pump and driver, 11, pumps fuel from the pump inlet, 12, the common rail pump being driven from the engine crankshaft, 6, via connection, 13. The common rail pump and driver, 11, is controlled by the common rail pump control, 14, to maintain common rail pressure within the common rail chamber, 10. This common rail fuel injection system, 9, injects fuel, from the common rail, 10, into the cylinder gas volume, 4, during a time period for fuel injection. The pressure in the common rail chamber, 10, is thusly controlled to be sufficiently greater than the pressures prevailing in the cylinder gas volume, 4, of the engine, so as to assure adequate slurry fuel primary atomization into slurry droplets, when injected into the cylinder gas volume.
    (c) For the purposes of this invention, essentially full common rail pressure is to prevail, along essentially the entire slurry fuel path, thru the common rail up to the upstream side of the final fuel injector valve seat. Early mechanical 6 common rail fuel injection systems operated in this manner with full 7 common rail pressure acting constantly up to the single fuel injection valve.

This early system required a reliable and durable fuel injector valve 9 seat, to avoid continuous fuel leakage into the engine cylinder. Many modern common rail fuel injection systems place an additional on-off pressure valve, for each fuel injector, between the common rail, and the final fuel injector valve. This on-off valve applies common rail pressure to the final fuel injector valve only when fuel injection into the engine cylinder is to occur. In this way the on-off valve functions to greatly reduce the likelihood of continuous fuel leakage into the engine cylinder.

An illustrative example form of fuel injector nozzle, with double valves, suitable for use with the common rail fuel injection system of this invention, is shown schematically in FIG. 7, and comprises the following elements. The injector valve, 60, seats at, 61, against the nozzle housing, 62, when closed. The cylindrical on-off pressure valve, 63, seats at, 64, against the nozzle housing, 62, when closed. Common rail pressure is applied via the passage, 65. The injector valve, 60, and on-off pressure valve, 63, can be separately driven to open and close by various types of valve drivers, including solenoid and spring drivers, piezoelectric drivers, hydraulic drivers, mechanical drivers, and combination of such drivers, and these drivers are not shown in FIG. 7.

This example fuel injector nozzle can operate as follows. At the start of fuel injection into the engine cylinder volume the on-off pressure valve, 63, is opened and subsequently the injector valve, 60, is opened, and common rail pressure then causes fuel to be injected into the engine cylinder volume, 4, via the nozzle hole, 66. When fuel injection is to stop the on-off pressure valve, 63, is closed and subsequently the injector valve, 60, is closed, and the residual fuel within the trapped volume, 67, is left at the reduced pressure within the engine cylinder volume, 4. In this way, unwanted dribbling of fuel, into the engine cylinder volume, 4, when both the injector valve, 60, and the on-off pressure valve, 63, are closed, can only occur when both of the valves are leaking.

The residual fuel, within the trapped volume, 67, when depressurized, will have lost much of its dissolved atomizing gas. When subsequently injected into the engine cylinder volume, on the next engine cycle, this residual fuel quantity will receive little or no supplementary atomization. For this reason the trapped volume, 67, is preferably to be minimized, with a short length, and minimum but functional radial thickness.

2. One particular example of a supplementary slurry fuel atomizer and supply system portion of the combination is illustrated schematically in FIG. 1, and comprises the following elements:

(a) The contactor chamber, 15, includes an upper portion, 16, occupied in part by gas, and a lower portion, 17, occupied by slurry fuel, and these upper and lower portions are flow connected together. This contactor chamber is to be operated at a contactor chamber pressure, PC, less than the common rail pressure, and appreciably greater than the pressure prevailing in the cylinder gas volume during the time when slurry is injected into the cylinder gas volume.

(b) The slurry fuel pump and driver, 18, pumps slurry fuel from a source of slurry fuel, 19, into the upper portion, 16, of the contactor chamber. Slurry fuel, at least partially saturated with atomizing gas, is transferred, from the lower portion, 17, of the contactor chamber, into the inlet, 12, of the common rail pump and driver, 11, via transfer connection, 23, and from there into the common rail, 10. As a result slurry fuel flows downward through the contactor chamber, 15.

(c) Slurry fuel level sensors, 20, for sensing the slurry level, 21, in the contactor chamber, 15, are input to a slurry fuel pump and driver control, 22, which operates to keep the lower portion, 17, of the contactor chamber full of slurry fuel, and to keep the slurry fuel level out of the upper portion, 16, of the contactor chamber.

Figure 1:
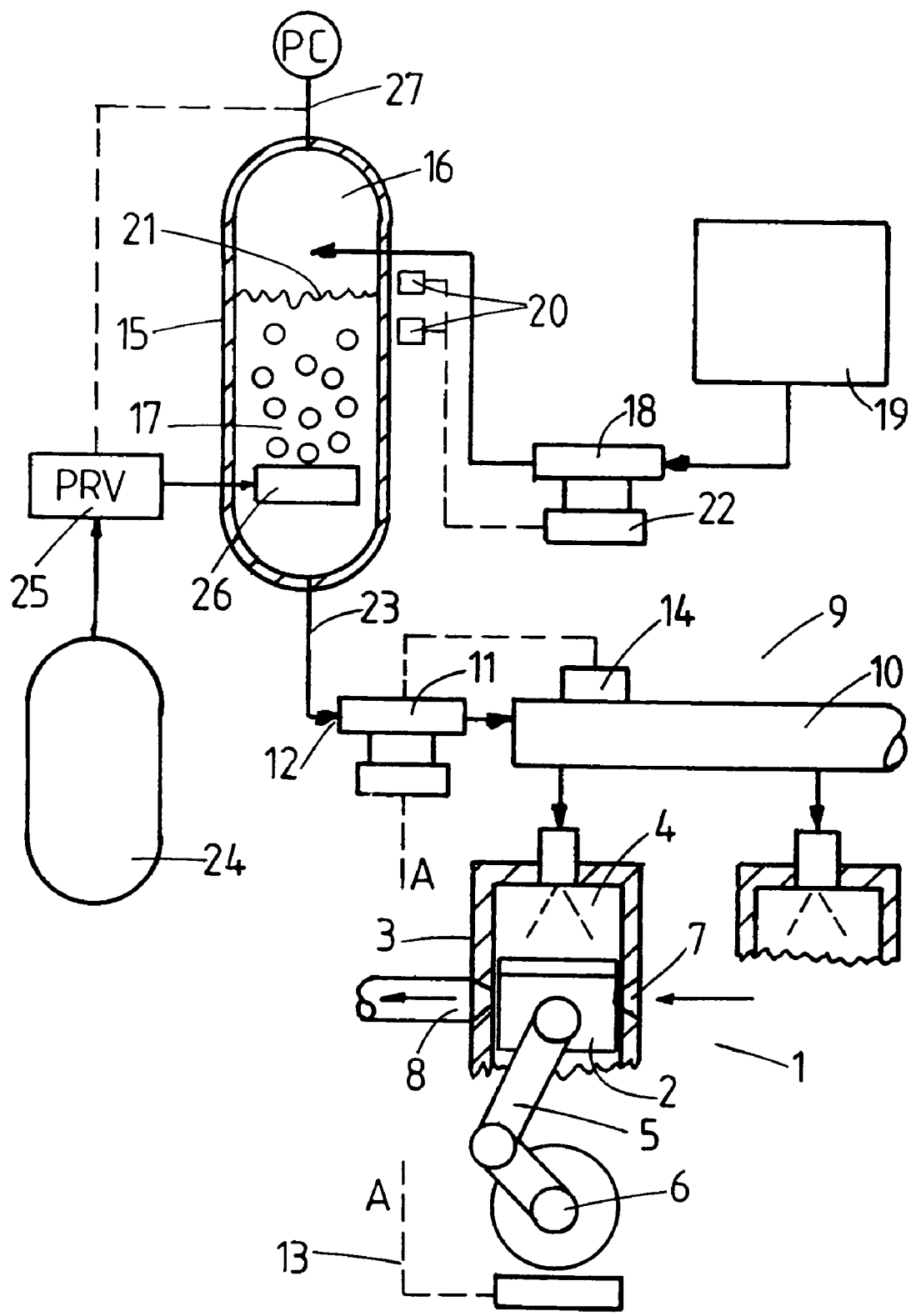

(d) For this FIG. 1 example form of the invention, the atomizing gas source, 24, is a high pressure source of atomizing gas, whose pressure is greater than the contactor chamber pressure, PC. From this high pressure atomizing gas source, the atomizing gas is transferred, by the atomizing gas transfer pressure regulator, 25, into the contactor chamber, 15, at a level well below where slurry fuel is transferred into the contactor chamber and for the FIG. 1 form of invention into the slurry fuel within the lower portion of the contactor chamber. Being of lower density than the slurry fuel, the atomizing gas rises upward, from a distributor, 26, in the form of gas bubbles, through the slurry fuel in the lower portion, 17, of the contactor chamber, 15. Within the contactor chamber, this upward flow of atomizing gas is countercurrent to the downward flow of slurry fuel. The resulting close contact of rising atomizing gas bubbles with slurry fuel, allows atomizing gas to be dissolved, at contactor chamber pressure, into the continuous water phase of the slurry fuel. By use of a long countercurrent flow path, where slurry fuel and atomizing gas are thusly in contact, the water phase of the slurry fuel, leaving the bottom of the contactor chamber, via the transfer connection, 23, can become almost fully saturated with dissolved atomizing gas. Atomizing gas also occupies the upper portion, 16, of the contactor chamber, above the controlled slurry fuel level, 21. A sensor of the contactor chamber gas pressure, 27, in this upper portion is input to control the pressure regulator form of atomizing gas transferor, 25, and contactor chamber pressure, PC, is maintained approximately constant, about an average value, between an upper set value and a lower set value. When contactor chamber pressure drops below the lower set value, the atomizing gas transfer regulator increases the flow rate of atomizing gas into the contactor chamber, and when contactor chamber pressure rises above the upper set value the atomizing gas transfer regulator decreases the flow rate of atomizing gas into the contactor chamber.

(e) Contactor chamber average pressure is thusly controlled to be greater than the pressure prevailing in the engine cylinder gas volume, during the time when slurry fuel is being injected. In this way atomizing gas will expand out of the water phase, within each slurry fuel droplet, only when the slurry fuel is injected into the lower pressure of the engine cylinder gas volume.

(f) Contactor chamber average pressure is thusly controlled to be less than common rail pressure, so that the slurry fuel, after dissolving atomizing gas at contactor chamber pressure, will not experience a lower pressure, until finally injected into the engine cylinder gas volume. Were the gas saturated slurry fuel to experience pressure well below contactor chamber pressure, while transferring from the contactor chamber, through the fuel injection system, slurry fuel foaming could result, and fuel injection system metering would be disrupted. In many types of conventional, non common rail, fuel injection systems, such pressure drop before fuel injection can occur, and it is for this reason that a common rail type of fuel injection system is needed for the purposes of this invention.

(g) For this FIG. 1 form of the invention, all of the atomizing gas needs to be highly soluble in water, since very low solubility gas portions would accumulate in the upper portion, 16, of the contactor chamber, and eventually stop the flow of atomizing gas into the contactor chamber. Pure carbon dioxide gas, in a high pressure gas cylinder, would be a suitable atomizing gas source, 24, for this FIG. 1 form of the invention, and carbon dioxide gas is highly soluble in water. But it is a disadvantage of this FIG. 1 form of the invention that a high pressure pure gas source is needed and is expensive.

(h) This FIG. 1 form of the invention operates as follows. Slurry fuel, from its source, 19, is transferred into the upper portion, 16, of the contactor chamber, 15, and flows downward therethrough. On its passage through the high pressure contactor chamber, the water portion of the slurry fuel dissolves atomizing gas, being transferred, from its source, 24, into the contactor chamber, 15. The thusly at least partially atomizing gas saturated slurry fuel transfers, from the bottom of the contactor chamber, into the inlet of the common rail pump, 11, and on into the common rail, 10, of the common rail fuel injection system. Slurry fuel injected into the cylinder gas volume, 4, from the common rail, 10, is atomized by injection, into many small slurry droplets, within each of which are many separate fuel particles. At the lower pressures prevailing in the cylinder gas volume, the atomizing gas, previously dissolved into the water portion of the slurry, at the higher contactor chamber pressure, expands out of solution, and separates the many separate fuel particles within each slurry fuel droplet. The thusly separated fuel particles provide a large fuel surface area for oxygen access, during the subsequent fuel ignition and combustion process, following after evaporation of the water portion of the slurry. In this way, a higher rate of fuel combustion, and more complete fuel burnup, is achieved, than would be possible if the many separate fuel particles, within each slurry fuel droplet, had not been thusly separated by atomizing gas expansion. This is a principal beneficial object of this invention, that efficient combustion of residual petroleum fuels, and tars, and coal, etc., can be achieved in small bore, high speed, internal combustion engines, by preatomizing these fuels into a water slurry.

Figure 2:
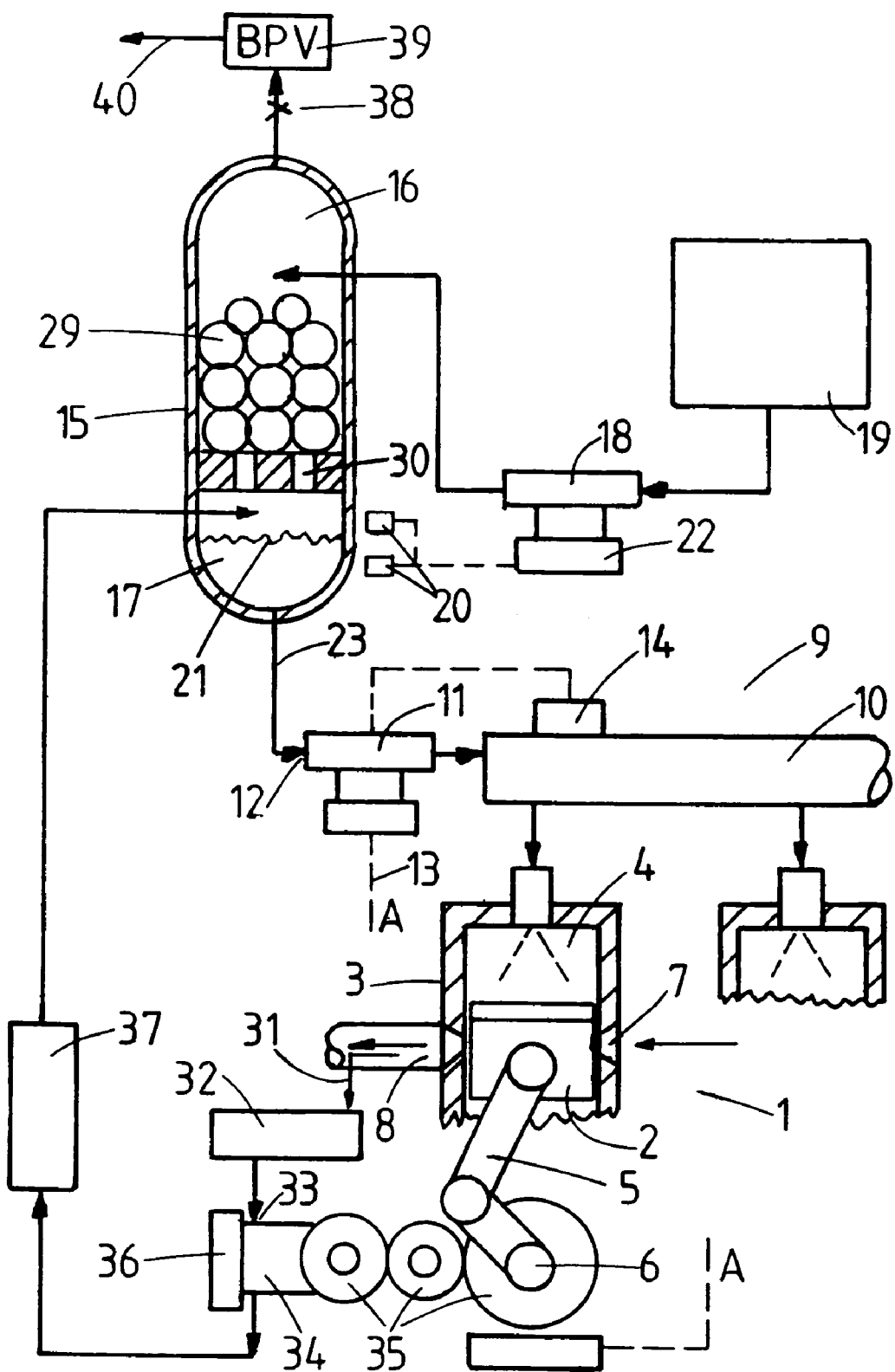

B. The FIG. 2 Form of this Invention
  1. In principal, many different gases, and gas mixtures, could be used as the atomizing gas in this invention, since many gases are water soluble, and the amount of gas dissolved into the water increases approximately linearly with increasing gas pressure. Carbon dioxide gas is particularly attractive for use as atomizing gas, since it is highly soluble in water. But pure carbon dioxide gas, free of low solubility gas portions, is expensive. Internal combustion engine exhaust gas contains carbon dioxide, from the fuel combustion, together with some oxygen, of moderate water solubility, and a principal portion of nitrogen, of rather low water solubility. An example modified form of this invention is illustrated schematically in FIG. 2, suitable for the use of engine exhaust gas as the atomizing gas, and comprises:
  a) The piston internal combustion engine, 1, portion of the combination of this invention, as illustrated in FIG. 2, is the same two stroke cycle engine as is illustrated in FIG. 1, and as is described hereinabove. All forms of this invention can also be used in combination with four stroke cycle internal combustion engines.
  b) The common rail fuel injection system, 9, illustrated in FIG. 2, is similar to that illustrated in FIG. 1, and as is described hereinabove. Other forms of common rail fuel injection system can be used with this invention, provided that a high common rail pressure prevails throughout the injection system.
  c) A modified form of contactor chamber, 15, is illustrated in FIG. 2, wherein the upper portion, 16, is partially filled with chunks of packing materials, 29, such as glazed ceramic or other type materials, resting on a support element, 30, fitted with gas and slurry throughflow holes, these packing material chunks being of a shape, such as round, so that gas and liquids can readily flow through the contactor chamber.
  d) The slurry fuel system, comprising the source, 19, the slurry fuel pump and driver, 18, the slurry fuel transfer connection, 23, into the common rail pump, 11, illustrated in FIG. 2, are similar to those described hereinabove for the FIG. 1 form of the invention.
  e) Internal combustion engine exhaust gas is transferred, from the engine exhaust system, 8, via the gas flow connection, 31, into an engine exhaust gas precooler, 32, and from the precooler into the suction inlet, 33, of a rotary atomizing gas pump, 34, driven directly, as by gears or belts, 35, from the internal combustion engine crankshaft, 6. The atomizing gas pump, 34, compresses the engine exhaust gas up to contactor chamber pressure, and transfers the compressed atomizing gas into the contactor chamber, 15, below the support element, 30, and below the chunks of packing material, 29, and thus at a level well below the level in the contactor chamber, where the slurry fuel is being transferred into the contactor chamber above the chunks of packing material. For the FIG. 2 form of this invention the atomizing gas pump, 34, is a positive displacement pump, of fixed volumetric displacement per revolution of the pump, as for example, a piston, cylinder and crank, compressor, and is driven directly from the internal combustion engine crankshaft, 6, with pump revolutions per unit of time being a constant multiple of crankshaft revolutions per unit of time. It is preferable to cool the atomizing gas passing through the atomizing gas pump, 34, as by use of pump cooling jackets, and interstage intercoolers, 36. It is also preferable to cool the atomizing gas after compression and before entering the contactor chamber, as by use of post coolers, 37. These several atomizing gas coolers act to reduce the work required to compress the atomizing gas, and increase the solubility of the atomizing gas in the water phase of the fuel in water slurry, since gas solubility increases as temperature is reduced.
  f) Within the contactor chamber, 15, the downward flowing slurry fuel, spread out over the surfaces of the packing material, 29, presents a large surface area of contact with the upward flowing atomizing gas, and portions of the atomizing gas, particularly the carbon dioxide portion, become dissolved into the liquid water phase of the slurry fuel, as desired for the purposes of this invention. But some portions of this engine exhaust as atomizing gas, such as the low solubility but major nitrogen portion, will not be fully dissolved into the water phase of the slurry fuel. These undissolved atomizing gas portions are discharged from the top of the contactor chamber, via a gas exit flow restrictor, 38, whose exit flow area, for this FIG. 2 form of the invention, is adjustable by a back pressure control, 39. The discharged atomizing gas is transferred into a receiver of discharged atomizing gas, 40, which for this FIG. 2 form of the invention, is the atmosphere. The back pressure control, 39, senses contactor chamber pressure, and operates to increase the area of the gas flow restrictor, when contactor chamber pressure exceeds an upper set value, and to decrease the gas flow restrictor area, when contactor chamber pressure is less than a lower set value. In this way the back pressure control, 39, functions to maintain an average contactor chamber pressure between the upper and lower set values. As for the FIG. 1 form of this invention, this average contactor chamber pressure, for the FIG. 2 form of this invention, is to be less than the common rail pressure, and appreciably greater than the pressure prevailing in the engine cylinder gas volume, 4, while slurry fuel is being injected thereinto, as described hereinabove.
  g) When a multicomponent atomizing gas, such as internal combustion engine exhaust gas, is used as atomizing gas, the quantity of each gas component, dissolvable into the water phase of the slurry fuel, varies approximately linearly with the partial pressure of the gas component in the atomizing gas, and the solubility of that component in water. Thus a larger portion of the high solubility carbon dioxide gas, in the engine exhaust gas, can be dissolved into the water phase than of the nitrogen gas, even though the carbon dioxide partial pressure is much less than the partial pressure of the low solubility nitrogen. Approximate calculations for a diesel engine exhaust gas, at rated power output, indicate that the gas, dissolvable into the water phase of the slurry fuel, will be about 80% by mols carbon dioxide gas, and only about 15% by mols nitrogen. It is thus possible to improve the supplementary slurry fuel atomizing capabilities, of this FIG. 2 form of the invention, by blending additional carbon dioxide gas into the internal combustion engine exhaust gas, to increase the partial pressure of carbon dioxide gas in the atomizing gas transferred into the contactor chamber.

h) Atmospheric air can also be used, instead of internal combustion engine exhaust gas, as a multicomponent atomizing gas, in the FIG. 2 form of this invention, the oxygen portion possessing moderate solubility in water. Also the supplementary slurry fuel atomizing capabilities of air can be improved by blending carbon dioxide gas with the air.

i) A risk of explosions, within the contactor chamber, exists when atomizing gases containing molecular oxygen, such as atmospheric air, or diesel engine exhaust gas at light loads, are used in combination with fuels containing some volatile portions, such as bituminous coals, and perhaps some residual petroleum fuels. Such explosions could be initiated by an unlikely, but possible, electric spark, or by a pressure wave. This explosion risk can be reduced by blending carbon dioxide gas into those atomizing gases containing molecular oxygen.

C. The FIG. 3 Form of this Invention

1. To achieve the purposes of this invention, contactor chamber pressure needs to appreciably exceed the pressure in the cylinder gas volume during slurry injection. Cylinder gas volume pressures, during slurry injection, can be as high as 500 to 1000 psia, depending on internal combustion engine compression ratio, and slurry fuel injection timing. Hence contactor chamber pressures can be of the order of a few, or several, thousands of pounds per square inch. As a result the work of compressing the atomizing gas will create a loss of internal combustion engine work output and efficiency. Part of this work, lost to the compression of atomizing gas, can be recovered, by passing undissolved atomizing gas, being discharged from the top of the contactor chamber, through a work recovery engine. A particular example form of this invention, using such a work recovery engine is illustrated schematically in FIG. 3, and comprises:

a) The piston internal combustion engine, 1, and the common rail fuel injection system, 9, shown in FIG. 3, are similar to those shown in FIG. 1 and FIG. 2, as described hereinabove.

b) The slurry fuel system comprising a source, 19, slurry fuel pump and driver, 18, slurry fuel transfer connection, 23, into the common rail pump, 11, illustrated in FIG. 3, are similar to those described hereinabove for the FIG. 1 and FIG. 2 forms of this invention.

c) The contactor chamber, 15, illustrated in FIG. 3, is similar to that described hereinabove for the FIG. 2 form of the invention, and utilizes chunks of packing material, 29, within the contactor chamber.

d) Atmospheric air, 41, is the source of atomizing gas into the suction inlet, 42, of a rotary atomizing gas pump, 43, which is driven directly, as by gears or belts, 44, from the internal combustion engine crankshaft, 6. The atomizing gas pump, 43, compresses the air up to contactor chamber pressure, and transfers this compressed air, as atomizing gas, into the contactor chamber, 15, below the support element, 30, and below the chunks of packing material, 29. Preferably the air is cooled during compression, as by interstage intercoolers, 36, and also following compression, as by post coolers, 37, before being delivered into the contactor chamber, 15.

e) Within the contactor chamber, 15, the air, as atomizing gas, is partially dissolved into the water phase of the downward flowing slurry fuel, while flowing upward through the packing material. Undissolved air portions are discharged from the top of the upper portion, 16, of the contactor chamber, and pass, via the atomizing gas discharge flow connection, 45, into the gas flow inlet, 46, of the rotary work recovery engine, 47. This work recovery engine, 47, is gear or belt connected, 48, to the crankshaft, 6, of the internal combustion engine, so that the work recovered by this engine, 47, offsets in part the internal combustion engine work lost to driving the atomizing gas compressor, 43.

f) The undissolved atomizing gas portions expand through the work recovery engine, 47, and is discharged into the atmosphere, 49, as a receiver of discharged and expanded atomizing gas.

g) The combination of the atomizing gas compressor, 43, transferring atomizing gas into the contactor chamber, 15, with a work expander engine, 47, receiving and discharging undissolved atomizing gas out of the contactor chamber, can function as a contactor chamber pressure controller, for maintaining an essentially constant average pressure in the contactor chamber, 28. This controller would be responsive to a contactor chamber pressure sensor, 50, and would be operative to adjust the difference quantity, between the flow rate of atomizing gas into the contactor chamber, minus the flow rate of undissolved atomizing gas out of the contactor chamber. When contactor chamber pressure was below a lower set value, slightly below average contactor chamber pressure, this controller would increase this difference quantity. When contactor chamber pressure was above an upper set value, slightly above average contactor chamber pressure, this controller would decrease this difference quantity. In this way average contactor chamber pressure would be maintained essentially constant, and, as needed for all forms of this invention, less than common rail pressure, and greater than the pressure prevailing in the internal combustion engine cylinder gas volume during slurry fuel injection thereinto.

h) The particular example contactor chamber pressure sensor and control, shown in FIG. 3, utilizes this control of the difference in atomizing gas flow rates, into and out of the contactor chamber, and comprises: a contactor chamber pressure sensor, 50, is input to a controller, 51, of work recovery engine flow rate of undissolved atomizing gas. The controller, 51, increases the flow rate of atomizing gas through the work recovery engine, 47, when sensed contactor chamber pressure exceeds the upper set value, and decreases this flow rate when contactor chamber pressure is below the lower set value. The atomizing gas pump, 43, for this FIG. 3 form of the invention is of fixed displacement volume per revolution of the pump. Both the atomizing gas pump, 43, and the work recovery engine, 47, rotate at an essentially constant multiple of engine crankshaft rotation. The controller, 51, can function to thusly control the flow rate of undissolved atomizing gas, through the work recovery engine, in various ways, as by controlling the gas pressure at inlet to the work recovery engine, or by controlling the duration of gas admission into the work recovery engine cylinder volume, or by controlling the displacement volume per revolution of the work recovery engine.

i) Alternatively, a contactor chamber pressure sensor and control means could use a fixed displacement volume per revolution work recovery engine, in combination with a control of the atomizing gas flow rate out of the atomizing gas compressor and into the contactor chamber.

D. The FIG. 4 Form of this Invention

1. For use on small transportation vehicles, such as delivery trucks or taxicabs, a mechanically simple supplementary slurry fuel atomizer and supply system will be preferred, such as the FIG. 1 example of this invention. The work of compressing and cooling the atomizing gas can be carried out efficiently at a central compressor plant, serving a large number of vehicles. By using carbon dioxide as atomizing gas, almost all of which can be dissolved into the water phase of the slurry fuel, the work of compressing this atomizing gas can be limited to only those gases being utilized to carry out the supplementary atomization of the slurry fuel droplets. A disadvantage of this FIG. 1 form of the invention is that very high purity, and hence expensive, carbon dioxide gas is needed, since low solubility gas impurities will accumulate in the upper portion, 16, of the contactor chamber, and eventually slow or stop the flow of gas into the contactor chamber. Additionally, the atomizing gas supply source, 24, pressure needs to be much greater than contactor chamber pressure, since only that portion of the supply source pressure can be used which exceeds contactor chamber pressure.

Relatively inexpensive, commercial purity carbon dioxide gas is currently sequestered from furnace combustion gases, and used for various purposes, such as repressurizing oil fields to improve petroleum yield. This lower cost carbon dioxide could be used as the atomizing gas for this invention.

A modified form of the FIG. 1 form of this invention is illustrated schematically in FIG. 4, which overcomes some of these problems, and can utilize commercial purity carbon dioxide or other high solubility atomizing gas, and comprises:

a) The internal combustion engine, 1, the common rail fuel injection system, 9, and the slurry fuel transfer system, are similar to those illustrated in FIG. 1 and as described hereinabove.

b) Atomizing gas from a supply source tank, 54, at supply tank pressure, is transferred by an atomizing gas pump and driver, 53, into the contactor chamber, 15, below the support element, 30, and packing material, 29, in a similar manner as for the FIG. 2 form of the invention. The compressed atomizing gas can be cooled by passage through a post cooler, 57, before entering the contactor chamber.

c) Within the contactor chamber, 15, the downward flowing slurry fuel, spread out over the surfaces of the packing material, 29, presents a large surface area, for dissolving the atomizing gas flowing upward through the packing material. Undissolved portions of the atomizing gas are discharged, from the top of the upper portion of the contactor chamber, via a gas exit flow restrictor, 56, into the atmosphere as a receiver of discharged atomizing gas.

d) The atomizing gas pump and driver is an adjustable flow rate atomizing gas transfer pump, whose flow rate of atomizing gas into the contactor chamber, can be adjusted by the control, 55, responsive to the sensor, 27, of contactor chamber pressure, and is operative to maintain an essentially constant average contactor chamber pressure.

e) Some of the carbon dioxide gas, or other highly soluble gas, available from the supply source tank, 54, will be lost with the gas discharged via the gas exit flow restrictor, 56. This loss can be reduced: by using a longer contact path of slurry fuel with atomizing gas in the contactor chamber; by using smaller chunks of packing material to present a larger contact surface area; and by using a smaller exit flow restrictor area. A longer slurry fuel to atomizing gas contact path, within the contactor chamber, is functionally equivalent to recirculation of the undissolved gas, back through a shorter contact path contactor chamber.

f) The atomizing gas pressure in the supply source tank, 54, can be largely fully utilized, since the gas is pumped into the contactor chamber. Supply source tank starting pressure is preferably no greater than contactor chamber pressure. When depleted, a supply source tank is recharged at a central atomizing gas compressor facility.

Other Fuels and Gases Usable with the Invention

Some atomizing gases, such as carbon dioxide and oxygen, are more readily soluble in ethyl alcohol than in water. Thus the apparatus of this invention can also be used to improve the atomization of any fuel wherein at least some portions thereof are capable of dissolving at least some gases. As described above, a slurry fuel comprising non gaseous fuel particles suspended in a separate continuous water phase, satisfies this requirement, since many gases are soluble in the water portion of the slurry. A single phase liquid fuel, such as gasoline blended with ethyl alcohol, also satisfies this requirement, since both carbon dioxide and oxygen gas are soluble in the ethyl alcohol portion of this blend. Tentatively, many partially oxidized hydrocarbon compounds are likely to be capable of dissolving some gases, and these fuels, or fuel blends containing such compounds, can utilize the apparatus of this invention to improve atomization, following injection. Thus the apparatus of this invention can be used to improve the atomization and combustion of any gas dissolving fluid at least some portions of which are a combustible fuel, and at least some portions of which are capable of dissolving at least some gases, provided an atomizing gas is used at least some portions of which are soluble in the gas dissolving fluid.

This multifuel capability of piston internal combustion engines, equipped with the supplementary slurry fuel atomizer of this invention, to efficiently utilize a wide variety of conventional and alternative fuels, is a substantial advantage for engine users in today's uncertain and volatile fuels market.

Supplementary Atomizing Capacity

Primary atomization, by injection of the slurry into the compressed air in the cylinder gas volume, breaks up the slurry into many small slurry droplets, with each droplet containing many fuel particles. Within each slurry droplet, expansion of the dissolved atomizing gas, out of solution, separates these many fuel particles, thus accomplishing supplementary atomization. The extent of additional fuel particle separation, within each slurry droplet, is indicated by the supplementary atomizing index, (SAI):

$$(SAI) = \frac{\text{Atomizing Gas Volume Released}}{\text{Liquid Water Volume}}$$

The volume of atomizing gas released after injection depends upon the quantity of atomizing gas originally dissolved into the liquid water, while the slurry was passing through the contactor chamber at high pressure, and the lower pressure prevailing in the engine cylinder gas volume, while slurry fuel is being injected thereinto.

Approximate values for this supplementary atomizing index, (SAI), can be estimated with the following relation for a pure atomizing gas, such as carbon dioxide:

$$(SAI) = \left[\frac{Pc - PE}{K}\right]\left(\frac{TE}{PE}\right)(1923)$$

Wherein:
(PC)=Contactor chamber pressure, psia;
(PE)=Engine cylinder gas volume pressure at time of slurry injection, psia;
(TE)=Slurry temperature at injection, °R;
(K)=Gas solubility coefficient as listed in the *Handbook of Chemistry and Physics;*
Units of (K) are, (mmHg)(mols water);
(Mols Gas Dissolved)

For a multicomponent atomizing gas, such as air or engine exhaust gas, this approximate relation becomes as follows:

$$(SAI) = \left[\frac{Ca}{Ka} + \frac{Cb}{Kb} + \frac{Cc}{Kc}\right]\left[\frac{PC - 1}{PE}\right](1923)(TE)$$

Wherein:
Ca=Mol fraction component a;
Ka=Gas solubility coefficient for component a;
And similarly for components b and c;
Also, (Ca+Cb+Cc)=1.0, all atomizing gas components are included;

These relations for (SAI) are definitely approximate, since the data on gas solubility coefficients, (K), from the *International Critical Tables* and the *Handbook of Chemistry and Physics*, are for pressures very little different from one atmosphere, whereas the contactor chamber and engine cylinder gas volume pressures are of the order of 15 to 50 atmospheres. The simplifying assumption was here made that gas solubility increases linearly with pressure, and that the (K) values are constant at constant temperature. The further approximation was made that the slurry temperature at injection (TE), was very little different from that prevailing within the common rail prior to injection, and that heat transfer, from the hot cylinder gases, into the slurry droplet interior, was too slow to affect supplementary atomization. An arbitrary value of 545° R was selected for (TE). Thusly estimated values of (SAI) are shown on FIG. 5, for a diesel engine of 14 to 1 compression ratio, and for various values of contactor chamber pressure, (PC). At this engine compression ratio, and for slurry injection starting at about 20 to 30 degrees before piston top dead center, an approximate value of 400 psia was used for (PE). Calculated values of (SAI) are shown for three example atomizing gases: carbon dioxide; diesel engine exhaust gas at rated power output; and diesel engine exhaust gas enriched with an equal number of mols of carbon dioxide.

The enhanced supplementary atomizing capacity, achieved by use of higher contactor chamber pressure, is necessarily accomplished with increased engine power and efficiency lost to driving the atomizing gas pump and compressor. This power loss can be approximated as the isentropic work of compressing the atomizing gas up to contactor chamber pressure, and is herein expressed as the ratio of this work loss, to the fuel heating value, of the fuel portion of that slurry fuel into which this atomizing gas was at least partially compressed. For this approximate calculation the assumption was made that essentially all of the most soluble gas component was dissolved into the water portion of the slurry in the contactor chamber, and thus that lower solubility gas components were compressed, but only partially dissolved. The following approximate relation was used for estimates of the ratio of compressor work loss to fuel heating value:

$$\frac{\text{Compressor Work, Btu}}{\text{Fuel Heating Value, Btu}} = \frac{(Pc \text{ psia})(2.87)(hc - ho)(\text{lbs H}_2\text{O})}{(Ka)(\text{LHV})(\text{lbs Fuel})}$$

Wherein:
Compressor Work is in Btu;
Fuel Heating Value is in Btu for fuel lower heating value;
(hc-ho)=Isentropic work of compressing atomizing gas from atmospheric pressure up to contactor chamber pressure in Btu per lb mol of gas;
(LHV)=Lower heating value of the fuel component of the slurry, in Btu per lbmass of fuel;

$$\frac{\text{lbs Fuel}}{\text{lbs H}_2\text{O}} = \text{Weight ratio of fuel to liquid water in the slurry;}$$

(Ka)=Gas solubility coefficient of the most soluble component in the atomizing gas, $$\frac{\text{(mmHg)(mols water)}}{\text{(Mols gas)}};$$

Thusly estimated values of the ratio of compressor work loss to fuel heating value are shown on FIG. 6, for various atomizing gases and for various values of supplementary atomization index, (SAI). The engine conditions and other assumptions used for the FIG. 5 estimated values were also used for these FIG. 6 calculations. Also a slurry weight ratio of fuel to water of 1.0 was assumed for FIG. 6. The advantages of carbon dioxide as atomizing gas, are clearly shown in FIGS. 5 and 6, and result from its high water solubility. Also shown on FIG. 6 are similar estimated results for diesel engine exhaust gas as atomizing gas, with undissolved gases leaving the contactor chamber being expanded through an isentropic work recovery engine.

Engine experiments can be used to ascertain the value of supplementary atomization index (SAI), needed to obtain the combustion and efficiency advantages, potentially available by preatomizing high viscosity, or solid, fuels into a preatomized fuel in water slurry. Even small values of (SAI) will yield some benefit. But (SAI) values, beyond the point where fuel particles within each slurry droplet remain fully separated during water evaporation, and subsequent fuel combustion, will likely yield little or no additional benefit. The best operating value of (SAI) will probably vary appreciably, for different engine bore, and different common rail fuel injection systems, as well as with different fuels, and extent of preatomization.

Details of Elements

Both the slurry transfer pump, 18, and the common rail pump, 11, need to be sized for maximum engine power output fuel flow rate, in the form of the slurry flow rate to allow for the pumping of the water portion of the slurry.

(Fuel Flow Rate)=(Maximum BHP)(BSFC)

(Slurry Flow Rate)=(Fuel Flow Rate)

$$\left[1 + \frac{1}{\text{Slurry Ratio}}\right]$$

(Slurry Ratio)=

$$\left(\frac{\text{lbs mass fuel}}{\text{lbs mass water}}\right)$$

Wherein:
(Maximum BHP)=Maximum engine brake horsepower;
(BSFC)=Engine brake specific fuel consumption at maximum power, lbsmass fuel per brake horsepower per hour;
(Fuel Flow Rate) in lbsmass fuel per hour;

The atomizing gas compressor, 34, 43, can be sized to deliver at least sufficient gas, into the contactor chamber, so that the supply of the maximum solubility component, of the atomizing gas, is sufficient to saturate the water portion of the slurry fuel passing through the contactor chamber:

Atomizing Gas Flow Rate=(AGFR);lbmols/Hr.

$$(\text{AGFR}) = \frac{(\text{Max } BHP)(BSFC)(PC \text{ psia})(2.87)}{(\text{Slurry Ratio})(Ka)}; \text{lb mols/Hr.}$$

The required volumetric pumping capacity of the atomizing gas compressor will depend upon the pressure and temperature of the gas, as supplied to the intake of the compressor, and the volumetric efficiency of the compressor.

Multistage atomizing gas compressors will usually be preferred, as allowing the use of intercoolers between stages to reduce the work of compression.

A tall contactor chamber, 15, and with counterflow of slurry fuel downward, and atomizing gas upward, is preferred. Various methods of increasing the area of contact between slurry water and atomizing gas can be used such as the following:

(a) Many small atomizing gas bubbles rising through the liquid slurry are shown in FIG. 1.
(b) Chunks of packing material, over whose large exterior surface area the slurry fuel is spread, is shown in FIG. 2;
(c) Other forms of rectifying column can also be used, such as bubble plates, and as illustrated in the reference, *Principles of Chemical Engineering*, Walker, Lewis, McAdams, and Gilliland.

INDUSTRIAL USES OF THIS INVENTION

The residual fuel content of newly discovered crude oils has tended to increase with the passage of time. Indeed, some newer oil fields, such as the Athabaska tar sands, yield a crude oil which is essentially wholly residual fuel. Currently, direct transport use of these high viscosity residual fuels is confined to large bore, slow speed, marine diesel engines. Other transport engines currently require use of distillate petroleum fuels, which are expensive and in progressively shorter supply. Such distillate petroleum fuels can be prepared from residual portions of crude oil, but stock and hence energy losses result.

Preatomization of residual fuels, as also coal or coke fuels, into a fuel particle in water slurry, appears a promising means for utilizing residual fuels in smaller bore, higher speed, diesel engines. These smaller bore, higher speed diesel engines are the major power source for the critical transport portion of our economy, and are currently a major consumer of the limited supplies of expensive distillate petroleum fuels.

But engine experiments with preatomized coal particles in a water slurry, indicated that, the benefits expected from progressively smaller coal particle size were not realized. Apparently the increase of slurry viscosity with smaller coal particle size, produced larger slurry droplets from primary atomization due to injection. The small coal particles, within each of these larger droplets, reagglomerated into larger coal particles, when water evaporation occurred, and the anticipated benefits of preatomization were not achieved.

A principal beneficial object of this invention is to realize the potential benefits of residual petroleum fuel preatomization, to very small particles in a water slurry, by also dissolving atomizing gas into the water phase of this slurry before injection. After slurry injection into the engine cylinder, these dissolved atomizing gases expand out of solution, and thus separate the many small fuel particles and prevent particle agglomeration. In this way low cost residual petroleum fuels can be used in a large portion of our transport industries, such as railroads, tug and barge transport, farm machinery, and even truck and bus usage.

Residual petroleum fuels are currently used in industrial furnaces and steam boiler furnaces. But these stationary fuel uses can be more readily adapted to use of lower cost and widely available coal than can transport industry engines. In this way, wider use of residual petroleum fuel in the critical transport industry can contribute to achieving national energy independence.

Recent efforts to derive fuels, from farm crop materials, and suitable for use in conventional piston internal combustion engines, have been directed toward wholly liquid fuels, such as ethanol and vegetable oils. Only a small portion of the total crop cellulose product, created by photosynthesis with solar energy, results as ethanol or vegetable oil. A much greater useable energy production, per acre of farmland, could be realized by shredding all, or at least the non food portion, of the entire crop material, and slurrifying it into a continuous water phase, for use in engines of this invention.

I claim:

1. The combination of a piston internal combustion engine with a supplementary slurry fuel atomizer and supply system:

wherein said piston internal combustion engine comprises: a crankshaft; at least one piston and cylinder, each said piston and cylinder enclosing a cylinder gas volume; a common rail fuel injection system for injecting fuel into each said cylinder gas volume; an exhaust system for discharging burned exhaust gas from said cylinder gas volume;

wherein said common rail fuel injection system comprises: a common rail; a common rail pump and driver; and control means for controlling said common rail pump, so that common rail pressure is maintained within the common rail of said common rail fuel injection system, by pumping fluid, from the inlet of said common rail pump, into said common rail;

and further wherein said common rail pressure is essentially fully applied, along essentially the full length of the slurry fuel flow path, within said common rail up to said cylinder gas volume;

wherein said supplementary slurry fuel atomizer and supply system comprises:

a source of slurry fuel comprising non-gaseous fuel particles suspended in a continuous liquid water phase;

a source of atomizing gas, at least some portions of which are at least moderately soluble, and preferably highly soluble, in liquid water;

a contactor chamber for contacting slurry fuel with atomizing gas at contactor chamber pressure, and comprising an upper portion and a lower portion, these portions being flow connected together;

slurry fuel pump and driver means for transferring slurry fuel, from said source of slurry fuel, into said contactor chamber, and into the upper portion of said contactor chamber;

atomizing gas transfer means for transferring atomizing gas, from said source of atomizing gas into said contactor chamber, at contactor chamber pressure, and into a level within said contactor chamber well below the level at which slurry fuel is transferred into said contactor chamber;

slurry transfer means for transferring slurry fuel from the lower portion of said contactor chamber, into the inlet of said common rail pump of said common rail fuel injection system;

slurry fuel level sensor means for sensing the level of slurry fuel within said contactor chamber;

slurry fuel pump and driver control means for controlling the rate of transfer of slurry fuel, from said source of slurry fuel, into said contactor chamber, responsive to said slurry fuel level sensor, and operative to; keep the lower portion of said contactor chamber full of slurry fuel, and, keep the level of slurry fuel below the upper portion of said contactor chamber;

wherein said slurry level sensor means, and said slurry pump and driver control means, can be any one of the options: hand sensor and control means; automatic sensor and control means; and, a combination of hand and automatic sensor and control means;

whereby slurry fuel flows from said source of slurry fuel, into and downward through said contactor chamber, and into said inlet of said common rail pump, and into said common rail of said common rail fuel injection system, and is injected therefrom into said cylinder gas volumes of said internal combustion engine;

contactor chamber pressure sensor and control means for maintaining the gas pressure, in said contactor chamber, essentially constant about an average contactor chamber pressure, less than an upper set value of contactor chamber gas pressure, and greater than a lower set value of contactor chamber gas pressure, responsive to said contactor chamber pressure sensor, and operative to adjust the difference quantity of, the flow rate of atomizing gas into said contactor chamber, minus the flow rate of atomizing gas in gaseous form out of said contactor chamber, increasing said difference quantity when said sensed contactor pressure is less than said lower set value, and decreasing said difference quantity when said sensed contactor chamber pressure is greater than said upper set value;

wherein said average contactor chamber pressure is less than, said common rail pressure, and is greater than, and preferably appreciably greater than, the pressure prevailing in said cylinder gas volume, of said internal combustion engine, during the time period when slurry fuel is being injected thereinto;

wherein said common rail pressure is controlled to be sufficiently greater than the pressures prevailing in said cylinder gas volumes, of said internal combustion engine, as to assure adequate slurry fuel primary atomization, into slurry droplets, when injected into said cylinder gas volumes;

wherein said contactor chamber pressure sensor and control means can be any one of the options: hand sensor and control means; automatic sensor and control means; and a combination of hand and automatic sensor and control means;

whereby atomizing gas flows, from said source of atomizing gas, into said contactor chamber, countercurrent to said downward flow of slurry fuel therein and at least portions of said atomizing gas are dissolved into the water portion of said slurry fuel; and said dissolved portions of atomizing gas flow, with said slurry fuel, into the common rail of said common rail fuel injection system; and are injected with said slurry fuel into the cylinder gas volume of said internal combustion engine, where, at the lower pressures prevailing in said cylinder gas volume, said dissolved atomizing gas expands out of solution from said water portion, and separates the fuel particles, within each slurry fuel droplet, into separated fuel particles, thus increasing the fuel surface area available for fuel burning, and hence the rate and completeness of fuel combustion within each cylinder gas volume.

2. A combination of a piston internal combustion engine with a supplementary slurry fuel atomizer and supply system, as described in claim 1:

wherein said contactor chamber pressure sensor and control means comprises:

a receiver of discharged atomizing gas;

gas exit flow restrictor means for discharging a restricted exit flow of gas from the top of the upper portion of said contactor chamber, and into said receiver of discharged atomizing gas;

whereby atomizing gas flows upward through said contactor chamber, countercurrent to said downward flow of slurry fuel, and non-dissolved portions of said atomizing gas throughflow are discharged from the top of said contactor chamber via said gas exit flow restrictor.

3. A combination of a piston internal combustion engine with a supplementary slurry fuel atomizer and supply system, as described in claim 2:

wherein said receiver of discharged atomizing gas is the atmosphere;

wherein said contactor chamber pressure sensor and control means further comprises: a sensor of contactor chamber pressure; a contactor chamber back pressure control means for adjusting the gas flow area of said gas flow restrictor means, responsive to said contactor chamber pressure sensor, and operative to, increase said gas flow area when sensed contactor chamber pressure exceeds said upper set value of contactor chamber pressure, and to decrease said gas flow area when sensed contactor chamber pressure is less than said lower set value of contactor chamber pressure.

4. A combination of a piston internal combustion engine with a supplementary slurry fuel atomizer and supply system, as described in claim 3:

wherein said atomizing gas transfer means comprises rotary atomizing gas pump and driver means for transferring atomizing gas from said source into said contactor chamber, said pump being driven by the crankshaft of said internal combustion engine, with pump revolutions per unit of time being an essentially constant multiple of engine crankshaft revolutions per unit of time, and with pump displacement volume per pump revolution being essentially constant;

and further wherein said atomizing gas transfer means comprises gas cooling means for cooling said atomizing gas during said transfer from said source of atomizing gas into said contactor chamber.

5. A combination of a piston internal combustion engine with a supplementary slurry fuel atomizer and supply system, as described in claim 4:

wherein said atomizing gas is one chosen from the group of gases consisting of: carbon dioxide gas; atmospheric air; internal combustion engine exhaust gas; a blend of atmospheric air with added carbon dioxide gas; a blend of internal combustion engine exhaust gas with additional carbon dioxide; and a blend of atmospheric air, with internal combustion engine exhaust gas, and with carbon dioxide gas.

6. A combination of a piston internal combustion engine with a supplementary slurry fuel atomizer and supply system, as described in claim 1:

wherein said contactor chamber pressure sensor and control means comprises;

a gas exit flow restrictor means for discharging a restricted exit flow of undissolved atomizing gas, from the top of the upper portion of said contactor chamber, and into the atmosphere as a receiver of discharged atomizing gas;

a contactor chamber pressure sensor means for sensing contactor chamber pressure;

wherein said atomizing gas transfer means comprises adjustable flow rate atomizing gas pump and driver means for transferring atomizing gas, from said source of atomizing gas, into said contactor chamber;

wherein said contactor chamber pressure sensor and control means further comprises atomizing gas pump and driver control means for controlling said adjustable gas flow rate, responsive to said contactor chamber pressure sensor, and operative to; increase the rate of transfer of atomizing gas into said contactor chamber when contactor chamber pressure is less than said lower set value of contactor chamber pressure, and to decrease the rate of transfer of atomizing gas into said contactor chamber when said contactor chamber pressure is greater than said upper set value of contactor chamber pressure;

whereby atomizing gas flows upward through said contactor chamber, countercurrent to said downward flow of slurry fuel, and undissolved portions of said atomizing gas are discharged from the top of said contactor chamber.

7. A combination of a piston internal combustion engine with a supplementary slurry fuel atomizer and supply system, as described in claim 6, wherein said supplementary atomizing gas is carbon dioxide gas.

8. A combination of a piston internal combustion engine with a supplementary slurry fuel atomizer and supply system, as described in claim 1, and further comprising:

a receiver of discharged and expanded atomizing gas which is the atmosphere;

contactor chamber pressure sensor means for sensing the pressure in said contactor chamber;

an atomizing gas discharge flow connection from the top of said upper portion of said contactor chamber;

wherein said contactor chamber pressure control means for maintaining the pressure in said contactor chamber, essentially constant, comprises a combination of: a work recovery engine means for recovering gas expansion work from those atomizing gas portions being discharged from said contactor chamber via said discharge flow connection; and said atomizing gas pump and driver means for transferring atomizing gas from said source of atomizing gas into said contactor chamber;

a contactor chamber pressure control means for maintaining the gas pressure in said contactor chamber essentially constant, about an average contactor chamber pressure, less than an upper set value of contactor chamber gas pressure, and greater than a lower set value of contactor chamber pressure, and operative by adjusting the difference quantity of, the flow rate of atomizing gas into said contactor chamber, via said atomizing gas pump and driver, minus the flow rate of atomizing gas, in gaseous form, out of said contactor chamber, via said work recovery engine, increasing said difference quantity when said average contactor chamber pressure is less than said lower set value, and decreasing said difference quantity when said average contactor chamber pressure is greater than said upper set value;

wherein said work recovery engine comprises, a gas flow inlet connected to said atomizing gas discharge flow connection from said contactor chamber, a gas flow outlet connection to said receiver of discharged and expanded atomizing gas, and a recovered work output connection to said internal combustion engine;

and further wherein said atomizing gas pump and driver means for transferring atomizing gas comprises means for cooling said atomizing gas during said transfer from said source into said contactor chamber.

9. A combination of a piston internal combustion engine with a supplementary slurry fuel atomizer and supply system, as described in claim 8:
wherein said atomizing gas pump and driver means for transferring atomizing gas from said source of atomizing gas, into said contactor chamber, is driven by the internal combustion engine crankshaft, at an essentially constant multiple of engine crankshaft revolutions per unit of time, and mechanically displaces an essentially constant volume per revolution of the pump;
wherein said work recovery engine means is of the positive displacement type, comprising a work output shaft, and with a constant engine mechanical displacement volume per revolution of said work output shaft;
and further wherein the work output shaft, of said work recovery engine, is directly coupled to the crankshaft of said internal combustion engine and rotates at an essentially constant multiple of engine crankshaft revolutions per unit of time;
wherein said contactor chamber pressure control means, for maintaining an essentially constant contactor chamber pressure, is one chosen from the group of contactor chamber pressure control means consisting of: an atomizing gas pump flow control means for controlling the flow rate of atomizing gas into said contactor chamber, in combination with a fixed volumetric flow rate per revolution work recovery engine; and, a work recovery engine flow control means for controlling the flow rate of discharged atomizing gas out of said contactor chamber, in combination with a fixed volumetric flow rate per revolution atomizing gas pump and driver.

10. A combination of a piston internal combustion engine with a supplementary slurry fuel atomizer and supply system, as described in claim 9:
wherein said atomizing gas is one chosen from the group of gases consisting of: carbon dioxide gas; atmospheric air; internal combustion engine exhaust gas; a blend of atmospheric air with added carbon dioxide gas; a blend of internal combustion engine exhaust gas with additional carbon dioxide gas; and a blend of atmospheric air, with internal combustion engine exhaust gas, and with carbon dioxide gas.

11. The combination of a piston internal combustion engine with a supplementary fluid atomizer and supply system:
wherein said piston internal combustion engine comprises: a crankshaft; at least one piston and cylinder, each said piston and cylinder enclosing a cylinder gas volume; a common rail fuel injection system for injecting fuel into each cylinder gas volume; an exhaust system for discharging burned exhaust gas from said cylinder gas volume;
wherein said common rail fuel injection system comprises: a common rail; a common rail pump and driver; and control means for controlling said common rail pump, so that common rail pressure is maintained within the common rail of said common rail fuel injection system by pumping fluid, from the inlet of said common rail pump, into said common rail; and further wherein said common rail pressure is essentially fully applied along essentially the full length of the fluid flow path within said common rail up to said cylinder gas volume;
wherein said supplementary fluid atomizer and supply system comprises:
a source of gas dissolving fluid, at least some portions of which are a combustible, non-gaseous fuel, and at least some portions of which are capable of dissolving some gases;
a source of atomizing gas, at least some portions of which are soluble in said gas dissolving fluid;
a contactor chamber for contacting gas dissolving fluid with atomizing gas at contactor chamber pressure, and comprising an upper portion and a lower portion, these portions being flow connected together;
gas dissolving fluid pump and driver means for transferring gas dissolving fluid, from said source of gas dissolving fluid, into said contactor chamber, and into the upper portion of said contactor chamber;
atomizing gas transfer means for transferring atomizing gas, from said source of atomizing gas into said contactor chamber, at contactor chamber pressure, and into a level within said contactor chamber well below the level at which gas dissolving fluid is transferred into said contactor chamber;
gas dissolving fluid transfer means for transferring fluid from the lower portion of said contactor chamber, into the inlet of said common rail pump of said common rail fuel injection system;
gas dissolving fluid level sensor means for sensing the level of fluid within said contactor chamber;
gas dissolving fluid pump and driver control means for controlling the rate of transfer of fluid from said source of gas dissolving fluid into said contactor chamber, responsive to said gas dissolving fluid level sensor, and operative to; keep the lower portion of said contactor chamber full of fluid and, keep the level of fluid below the upper portion of said contactor chamber;
wherein said gas dissolving fluid level sensor means, and said gas dissolving fluid pump and driver control means, can be any one of the options: hand sensor and control means; automatic sensor and control means; and, a combination of hand and automatic sensor and control means;
whereby gas dissolving fluid flows, from said source of gas dissolving fluid, into and downward through said contactor chamber, and into said inlet of said common rail pump, and into said common rail of said common rail fuel injection system, and is injected therefrom into said cylinder gas volumes of said internal combustion engine;
contactor chamber pressure sensor and control means for maintaining the gas pressure, in said contactor chamber, essentially constant about an average contactor chamber pressure, less than an upper set value of contactor chamber gas pressure, and greater than a lower set value of contactor chamber gas pressure, responsive to said contactor chamber pressure sensor, and operative to adjust the difference quantity of, the flow rate of atomizing gas into said contactor chamber, minus the flow rate of atomizing gas in gaseous form out of said contactor chamber, increasing said difference quantity when said sensed contactor pressure is less than said lower set value, and decreasing said difference quantity when said sensed contactor chamber pressure is greater than said upper set value;
wherein said average contactor chamber pressure is less than said common rail pressure, and is greater than, and preferably appreciably greater than, the pressure prevailing in said cylinder gas volume, of said internal combustion engine, during the time period when gas dissolving fluid is being injected thereinto;

wherein said common rail pressure is controlled to be sufficiently greater than the pressures prevailing in said cylinder gas volumes, of said internal combustion engine, as to assure adequate atomization of said gas dissolving fluid, into fluid droplets, when injected into said cylinder gas volumes;

wherein said contactor chamber pressure sensor and control means can be any one of the options: hand sensor and control means; automatic sensor and control means; and a combination of hand and automatic sensor and control means;

whereby atomizing gas flows, from said source of atomizing gas, into said contactor chamber, countercurrent to said downward flow of gas dissolving fluid therein and at least portions of said atomizing gas are dissolved into said gas dissolving fluid and said dissolved portions of atomizing gas flow, with said gas dissolving fluid, into the common rail of said common rail fuel injection system; and are injected with said gas dissolving fluid into the cylinder gas volume of said internal combustion engine, where, at the lower pressures prevailing in said cylinder gas volume, said dissolved atomizing gas expands out of solution from said gas dissolving fluid, and breaks up the gas dissolving fluid droplets, thus increasing the fuel surface area available for fuel burning, and hence the rate and completeness of fuel combustion within each cylinder gas volume.

12. A combination of a piston internal combustion engine with a supplementary fluid atomizer and supply system, as described in claim 11:

wherein said contactor chamber sensor and control means comprises:
  a receiver of discharged atomizing gas;
  gas exit flow restrictor means for discharging a restricted exit flow of gas from the top of the upper portion of said contactor chamber and into said receiver of discharged atomizing gas;
whereby atomizing gas flows upward through said contactor chamber, countercurrent to said downward flow of gas dissolving fluid, and non dissolved portions of said atomizing gas throughflow are discharged from the top of said contactor chamber via said gas exit flow restrictor.

13. A combination of a piston internal combustion engine with a supplementary fluid atomizer and supplementary system, as described in claim 12:

wherein said receiver of discharged atomizing gas is the atmosphere;
wherein said contactor chamber pressure sensor and control means further comprises: a sensor of contactor chamber pressure; a contactor chamber back pressure control means for adjusting the gas flow area of said gas exit flow restrictor means, responsive to said contactor chamber pressure sensor, and operative to, increase said gas flow area when sensed contactor chamber pressure exceeds said upper set value of contactor chamber pressure, and to decrease said gas flow area when sensed contactor chamber pressure is less than said lower set value of contactor chamber pressure.

14. A combination of a piston internal combustion engine with a supplementary fluid atomizer and supply system, as described in claim 13:

wherein said atomizing gas transfer means comprises rotary atomizing gas pump and driver means for transferring atomizing gas from said source into said contactor chamber, said pump being driven by the crankshaft of said internal combustion engine, with pump revolutions per unit of time being an essentially constant multiple of engine crankshaft revolutions per unit of time, and with pump displacement volume per pump revolution being essentially constant;

and further wherein said atomizing gas transfer means comprises gas cooling means for cooling and atomizing gas during said transfer from said source of atomizing gas into said contactor chamber;

wherein said atomizing gas transfer means comprises adjustable flow rate atomizing gas pump and driver means for transferring atomizing gas, from said source of atomizing gas, into said contactor chamber;

wherein said contactor chamber pressure sensor and control means further comprises atomizing gas pump and driver control means for controlling said adjustable gas flow rate.

15. A combination of a piston internal combustion engine with a supplementary fluid atomizer and supply system, as described in claim 11:

wherein said contactor chamber pressure sensor and control means comprises;
a gas exit flow restrictor means for discharging a restricted exit flow of undissolved atomizing gas, from the top of the upper portion of said contactor chamber, and into the atmosphere as a receiver of discharged atomizing gas;
a contactor chamber pressure sensor means for sensing contactor chamber pressure;
wherein said atomizing gas transfer means comprises adjustable flow rate atomizing gas pump and driver means for transferring atomizing gas, from said source of atomizing gas, into said contactor chamber;
wherein said contactor chamber pressure sensor and control means further comprises atomizing gas pump and driver control means for controlling said adjustable gas flow rate, responsive to said contactor chamber pressure sensor and operative to; increase the rate of transfer of atomizing gas into said contactor chamber when contactor chamber pressure is less than said lower set value of contactor chamber pressure, and to decrease the rate of transfer of atomizing gas into said contactor chamber when said contactor chamber pressure is greater than said upper set value of contactor chamber pressure;
whereby atomizing gas flows upward through said contactor chamber, countercurrent to said downward flow of fluid and undissolved portions of said atomizing gas are discharged from the top of said contactor chamber.

16. A combination of piston internal combustion engine with a supplementary fluid atomizer and supplementary system, as described in claim 11, and further comprising;

a receiver of discharged and expanded atomizing gas which is the atmosphere;
contactor chamber pressure sensor means for sensing the pressure in said contactor chamber;
an atomizing gas discharge flow connection from the top of said upper portion of said contactor chamber;
wherein said contactor chamber pressure control means for maintaining the pressure in said contactor chamber, essentially constant, comprises a combination of: a work recovery engine means for recovering gas expansion work from those atomizing gas portions being discharged from aid contactor chamber via said discharge flow connection; and said atomizing gas pump and driver means for transferring atomizing gas from said source of atomizing gas into said contactor chamber;

a contactor chamber pressure control means for maintaining the gas pressure in said contactor chamber essentially constant, about an average contactor chamber pressure, less than an upper set value of contactor chamber gas pressure, and greater than a lower set value of contactor chamber pressure, and operative by adjusting the difference quantity of, the flow rate of atomizing gas into said contactor chamber, via said atomizing gas pump and driver, minus the flow rate of atomizing gas, in gaseous form, out of said contactor chamber, via said work recovery engine, increasing said difference quantity when said average contactor chamber pressure is less than said lower set value, and decreasing said difference quantity when said average contactor chamber pressure is greater than said upper set value;

wherein said work recovery engine comprises, a gas flow inlet connected to said atomizing gas discharge flow connection from said contactor chamber, a gas flow outlet connection to said receiver of discharged and expanded atomizing gas, and a recovered work output connection to said internal combustion engine;

and further wherein said atomizing gas pump and driver means for transferring atomizing gas comprises means for cooling said atomizing gas during said transfer from said source into said contactor chamber.

17. A combination of piston internal combustion engine with a supplementary fluid atomizer and supplementary system, as described in claim 16:

wherein said atomizing gas pump and driver means for transferring atomizing gas from said source of atomizing gas, into said contactor chamber, is driven by the internal combustion engine crankshaft, at an essentially constant multiple of engine crankshaft revolutions per unit of time, and mechanically displaces an essentially constant volume per revolution of the pump;

wherein said work recovery engine means is of the positive displacement type, comprising a work output shaft, and with a constant engine mechanical displacement volume per revolution of said work output shaft;

and further wherein the work output shaft, of said work recovery engine, is directly coupled to the crankshaft of said internal combustion engine and rotates at an essentially constant multiple of engine crankshaft revolutions per unit of time;

wherein said contactor chamber pressure control means, for maintaining an essentially constant contactor chamber pressure, is one chosen from the group of contactor chamber pressure control means consisting of: an atomizing gas pump flow control means for controlling the flow rate of atomizing gas into said contactor chamber, in combination with a fixed volumetric flow rate per revolution work recovery engine; and a work recovery engine flow control means for controlling the flow rate of discharged atomizing gas out of said contactor chamber, in combination with a fixed volumetric flow rate per revolution atomizing gas pump and driver.

* * * * *

UNITED STATES PATENT AND TRADEMARK OFFICE
CERTIFICATE OF CORRECTION

PATENT NO. : 7,281,500 B1
APPLICATION NO. : 11/633107
DATED : October 16, 2007
INVENTOR(S) : Joseph Carl Firey It is certified that error appears in the above-identified patent and that said Letters Patent is hereby corrected as shown below:

Column 4, line 20: Delete the numeral "6";
Column 4, line 21: Delete the numeral "7";
Column 4, line 25: Delete the numeral "9";

Column 13, line 47: Amend to read:

-- Units of K are: $\dfrac{(mm\ Hg)(mols\ water)}{(mols\ gas\ dissolved)}$ --;

Column 13, line 54: Amend to read:

$$-- (SAI) = \left[\dfrac{C_a}{K_a} + \dfrac{C_b}{K_b} + \dfrac{C_c}{K_c}\right]\left[\left(\dfrac{PC}{PE}\right) - 1\right](1923)(TE) \ --;$$

Column 15, line 32: Amend to read:

$$-- (\text{Slurry Flow Rate}) = (\text{Fuel Flow Rate})\left[1 + \dfrac{1}{\text{Slurry Ratio}}\right] \ --;$$

Column 15, line 40: Amend to read:

$$-- (\text{Slurry Ratio}) = \left(\dfrac{lbs\ mass\ fuel}{lbs\ mass\ water}\right) \ --.$$

Signed and Sealed this

Twenty-third Day of March, 2010

David J. Kappos
*Director of the United States Patent and Trademark Office*